United States Patent
Zhu et al.

(10) Patent No.: US 7,430,664 B2
(45) Date of Patent: Sep. 30, 2008

(54) SYSTEM AND METHOD FOR SECURELY PROVIDING A CONFIGURATION FILE OVER AND OPEN NETWORK

(75) Inventors: Yuesheng Zhu, San Jose, CA (US); Chih-Ping Lee, Cupertino, CA (US)

(73) Assignee: Innomedia Pte, Ltd, Singapore (SG)

( * ) Notice: Subject to any disclaimer, the term of this patent is extended or adjusted under 35 U.S.C. 154(b) by 710 days.

(21) Appl. No.: 11/049,468

(22) Filed: Feb. 2, 2005

(65) Prior Publication Data

US 2006/0174018 A1 Aug. 3, 2006

(51) Int. Cl.
*H04L 9/00* (2006.01)

(52) U.S. Cl. .............................. 713/168; 713/1; 713/2; 713/169; 713/175; 713/189; 709/220; 709/228; 709/229; 726/14

(58) Field of Classification Search ................ 709/220, 709/228, 229; 713/1, 2, 169, 168, 175, 189; 726/14
See application file for complete search history.

(56) References Cited

U.S. PATENT DOCUMENTS

| | | | | |
|---|---|---|---|---|
| 6,263,437 | B1 * | 7/2001 | Liao et al. .................... | 713/169 |
| 7,089,553 | B1 * | 8/2006 | Glaser et al. ................. | 717/178 |
| 7,188,161 | B1 * | 3/2007 | O'Neil et al. ................ | 709/220 |
| 7,246,238 | B2 * | 7/2007 | Mullen et al. ................ | 713/175 |
| 7,340,057 | B2 * | 3/2008 | Martin et al. ................ | 380/247 |
| 7,392,391 | B2 * | 6/2008 | Eibach et al. ................ | 713/175 |
| 7,398,389 | B2 * | 7/2008 | Teal et al. .................... | 713/164 |
| 2002/0124245 | A1 * | 9/2002 | Maddux et al. ............. | 717/176 |
| 2003/0023849 | A1 * | 1/2003 | Martin et al. ................ | 713/176 |
| 2003/0084350 | A1 * | 5/2003 | Eibach et al. ................ | 713/201 |
| 2003/0115461 | A1 * | 6/2003 | O'Neill ....................... | 713/170 |

* cited by examiner

*Primary Examiner*—Kimyen Vu
*Assistant Examiner*—Beemnet W Dada
(74) *Attorney, Agent, or Firm*—Timothy P. O'Hagan

(57) ABSTRACT

A method for securely provisioning a device for operation within a service provider infrastructure over an open network comprises the device establishing physical and data link layer network connections for communication on at least a subnet of the open network and obtaining a network configuration data such as an IP address and a subnet mask from a provisioning server that responds to a network configuration broadcast request. A device establishes a secure hypertext transport protocol connection to a first provisioning server that corresponds to one of: i) and IP address and port number; and ii) a fully qualified domain name stored in a non-volatile memory of the device. After mutual authentication, the first provisioning server provides at least one of: i) a configuration file; and ii) identification of a second provisioning server and a cipher key through the secure connection. If the first provisioning server provided identification of a second provisioning server, the device establishes a transport connection to the identified second provisioning server. The second provisioning server provides an encrypted file which, when decrypted using the cipher key yields the configuration information needed by the device for operation with the service provider infrastructure.

11 Claims, 11 Drawing Sheets

SYSTEM AND METHOD FOR SECURELY PROVIDING A CONFIGURATION FILE OVER AND OPEN NETWORK

TECHNICAL FIELD

The present invention relates to distribution of a configuration file over an open network and more specifically, to a system for using the known Trivial File Transfer Protocol (TFTP) for secure provisioning of devices over the Internet.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

In a separate field of technology, the Internet Protocols have facilitated widespread deployment of IP compliant packet switched networks for transferring of data between devices. When a device is coupled to an IP compliant network, it is assigned an IP address. Typically, a device obtains its IP address and other required IP networking information using a broad cast based protocol for locating a DHCP server capable of providing such information.

Recent advances in the speed of Internet data transmissions and Internet bandwidth have made it possible for telephone conversations to be communicated using the Internet's packet switched architecture. A Voice-Over-Internet Protocol (VoIP) is an IP compliant device capable of establishing and maintaining real time protocol (RTP) sessions for full duplex audio communication with a VoIP peer.

Although traditional PSTN telephone numbers are not required for peer-to-peer VoIP, a VoIP endpoint which is incapable of performing both inbound and outbound calls to PSTN telephone numbers is of little value.

Internet telephony service providers have added value to peer-to-peer VoIP technology by providing infrastructure that enables a VoIP endpoint to emulate a traditional PSTN telephone line—with the subscriber loop being replaced by session signaling and RTP media sessions between the VoIP endpoint and the service provider's systems.

Such systems enable the VoIP endpoint to be assigned a PSTN routable telephone number, place calls to telephone numbers that terminate on the PSTN, place calls to telephone numbers that terminate at another VoIP endpoint, and receive calls placed to the assigned telephone number—whether placed from a PSTN endpoint or another VoIP endpoint.

The service provider's system comprise a combination of soft switches, call agents, proxy servers, trunking gateways, signaling gateways, accounting servers, and various other servers useful for the set up, maintenance, and tracking of telephone usage for each customer's VoIP endpoint.

Therefore, when an Internet telephony device is coupled to an IP network, not only does the Internet telephony device need to obtain an IP address and the required networking configuration provided by a DHCP server, but the device also needs to obtain its configuration for operation with the Internet telephony service provider's systems—and when appropriate, obtain updates to such configuration.

In existing provisioning systems, the VoIP endpoint contacts an appropriate DHCP server to obtain DHCP extensions which identify the service provider's servers. However, DHCP provisioning is insecure. Further, any files provided by servers that operate insecure protocols (such as TFTP) are also insecure.

This insecure provisioning can lead to one of several results including in-operation of the Internet telephony device or unintended operation of the Internet telephony device with another communication service provider's system.

Existing secure provisioning systems, such as the provisioning system proposed by Cable Television Laboratories in its specification entitled "PacketCable MTA Device Provisioning Specification" numbered PKT-SP-PROV-I10-040730, propose using DHCP options such that a DHCP server can provide: i) a fully qualified domain name for the Internet telephony service provider's SNMP server and TFTP server; and ii) an IP address for the Internet telephony service provider's SYSLOG server.

PKINIT, an extension of Kerberos, is used to establish a secure connection between the VoIP endpoint and the provisioning servers. However, such a system is very complicated to deploy and maintain because, before communicating with the provisioning servers, the VoIP endpoint must authenticate its self to the Keberos infrastructure and obtain the appropriate tickets from a Kerberos key distribution server.

What is needed is a system for secure provisioning of an Internet telephony device that does not suffer the disadvantages of the above described systems. More specifically, what is needed is a system which assures both: i) that the Internet telephony device contacts the correct servers for obtaining its Internet telephony configuration; and ii) that its Internet telephony configuration is provided in a secure manner to prevent unintended (or fraudulently intended) operation with the wrong service provider's systems.

SUMMARY OF THE INVENTION

The present invention is represented by two exemplary embodiments discussed herein. The first exemplary embodiment includes secure provisioning of an Internet telephony device using a system in which the Internet telephony device establishes a secure connection to an HTTPS server and obtains a configuration file (or image) through the HTTPS connection.

The second exemplary embodiment includes secure provisioning of an Internet telephony device using a three phase process. In the first phase, the Internet telephony device establishes a connection with an HTTPS server and obtains a second provisioning server ID and a cipher key from the HTTPS server over the secure connection. In the second phase, the Internet telephony device contacts the second provisioning server (for example a TFTP server) and obtains an encrypted file from the second provisioning server. In the third phase, the Internet telephony device uses the cipher key provided by the HTTPS server to decrypt the encrypted file—which yields a configuration file (or image).

A first aspect of the present invention is a provisioning system for authenticating an authorized device, such as an Internet telephony device, and providing a configuration instruction to the authorized device over an open network.

The system comprises a non-volatile storage for storing, for each a plurality of authorized devices, a configuration instruction in association with an identification of the authorized device.

The system further comprises a secure transport module for receiving a hyper text transport protocol connection request from a device and, in response thereto, establishing a secure hyper text transport protocol communication channel with the device using a symmetric encryption algorithm and a mutually calculated shared secret key.

The system further comprises a provisioning module for providing, through the secure communication channel, the configuration instruction to the device only if an identification of the device included in a device authentication certificate matches the identification of an authorized device with which a configuration instruction is associated.

In the exemplary embodiment, the configuration instruction may be one of: i) a configuration file and ii) a configuration image; and the configuration instruction may include at least one of: i) configuration parameters for the authorized device; and ii) identification of a second provisioning server identification and a cipher key.

In the exemplary embodiment, the provisioning system comprises a server authentication certificate which includes identification of the provisioning system. As such, the provisioning system provides the server authentication certificate to the device and the mutually calculated shared secret key is calculated from a private key value and a public key value provided by the device in a Diffie-Hellman parameter using Diffie-Hellman techniques.

In the exemplary embodiment, the system further comprises a registration module for: i) authenticating a provisioning information server; ii) receiving from the provisioning information server, for each authorized device, the configuration instruction associated with the authorized device; and iii) writing the configuration instruction, in association with the device ID of the authorized device with which the configuration instruction associates, to the non volatile storage.

In an embodiment wherein the configuration instruction includes configuration parameters for the authorized device, the provisioning information server may comprise a database storing configuration parameters to be provided to an authorized device and a configuration instruction application.

The configuration instruction application provides for: i) looking up configuration parameters associated with an authorized device and generating the configuration instruction; and ii) providing the configuration instruction, in association with identification of an authorized device with which the configuration instruction associates, to the registration module.

In an embodiment wherein the configuration instruction includes the identification of a second provisioning server and a cipher key, the configuration instruction application may provide for: i) looking up configuration parameters associated with an authorized device and generating the cipher key and an encrypted configuration file (the encrypted configuration file be a file which when decrypted using the cipher key yields a configuration file or image comprising configuration parameters); ii) providing the encrypted configuration file to the second provisioning server; iii) encapsulating the identification of the second provisioning server and the cipher key into the configuration instruction; and iv) providing the configuration instruction, in association with identification of an authorized device with which the configuration instruction associates, to the registration module.

In a second exemplary embodiment, a provisioning system provides a configuration instruction (the configuration instruction being either a configuration file or a configuration image that includes identification of a second provisioning server and a cipher key) to an authorized device over an open network. The provisioning system comprises a first provisioning server and the second provisioning server.

The first provisioning server comprises a non-volatile storage for storing, for each of a plurality of authorized devices, a configuration instruction associated with the authorized device.

The first provisioning server further comprises a secure transport module for receiving a secure connection request from a device and, in response thereto, establishing a secure communication channel with the device using a symmetric encryption algorithm and a mutually calculated shared secret key.

A provisioning module provides, through the symmetrically encrypted communication channel, the configuration instruction to the device only if an identification of the device included in a device authentication certificate matches the identification of an authorized device witch which a configuration instruction is associated.

The second provisioning server comprises: i) an encrypted file configured for yielding one of a configuration file and a configuration image when decrypted using the cipher key; and ii) a file transfer module for providing the encrypted configuration file upon the authorized device on request from the device.

The file transfer module of the second provisioning server may be a TFTP server which: i) receives requests for files on a plurality of port numbers, each of the plurality of port numbers being uniquely associated with an encrypted configuration file; and ii) provides to the device the encrypted configuration file that uniquely associates with the port on which the device made its request to the second provisioning server.

In this exemplary embodiment, the first provisioning server includes a server authentication certificate which includes identification of the first provisioning server. As such, the first provisioning server provides the server authentication certificate to the device and the mutually calculated shared secret key is calculated, by the first provisioning server, from a private key value and a public key value provided by the device in a Diffie-Hellman parameter using Diffie-Hellman techniques.

Further in this exemplary embodiment, the first provisioning server may include a registration module for: i) authenticating a provisioning information server; ii) receiving from the provisioning information server, for each authorized device, the configuration instruction associated with the authorized device; and iii) writing the configuration instruction, in association with the device ID of the authorized device with which the configuration instruction associates, to the non volatile storage.

The provisioning information server may comprise a database storing configuration parameters to be provided to an authorized device and a configuration instruction application for: i) looking up configuration parameters associated with an authorized device and generating the cipher key and the encrypted configuration file; ii) providing the encrypted configuration file to the second provisioning server; iii) encapsulating the identification of the second provisioning server and the cipher key into the configuration instruction; and iv) providing the configuration instruction, in association with identification of an authorized device with which the configuration instruction associates, to the first provisioning server.

For a better understanding of the present invention, together with other and further aspects thereof, reference is made to the following description, taken in conjunction with the accompanying drawings. The scope of the present invention is set forth in the appended clams.

DETAILED DESCRIPTION OF THE EXEMPLARY EMBODIMENTS

Figure 1:
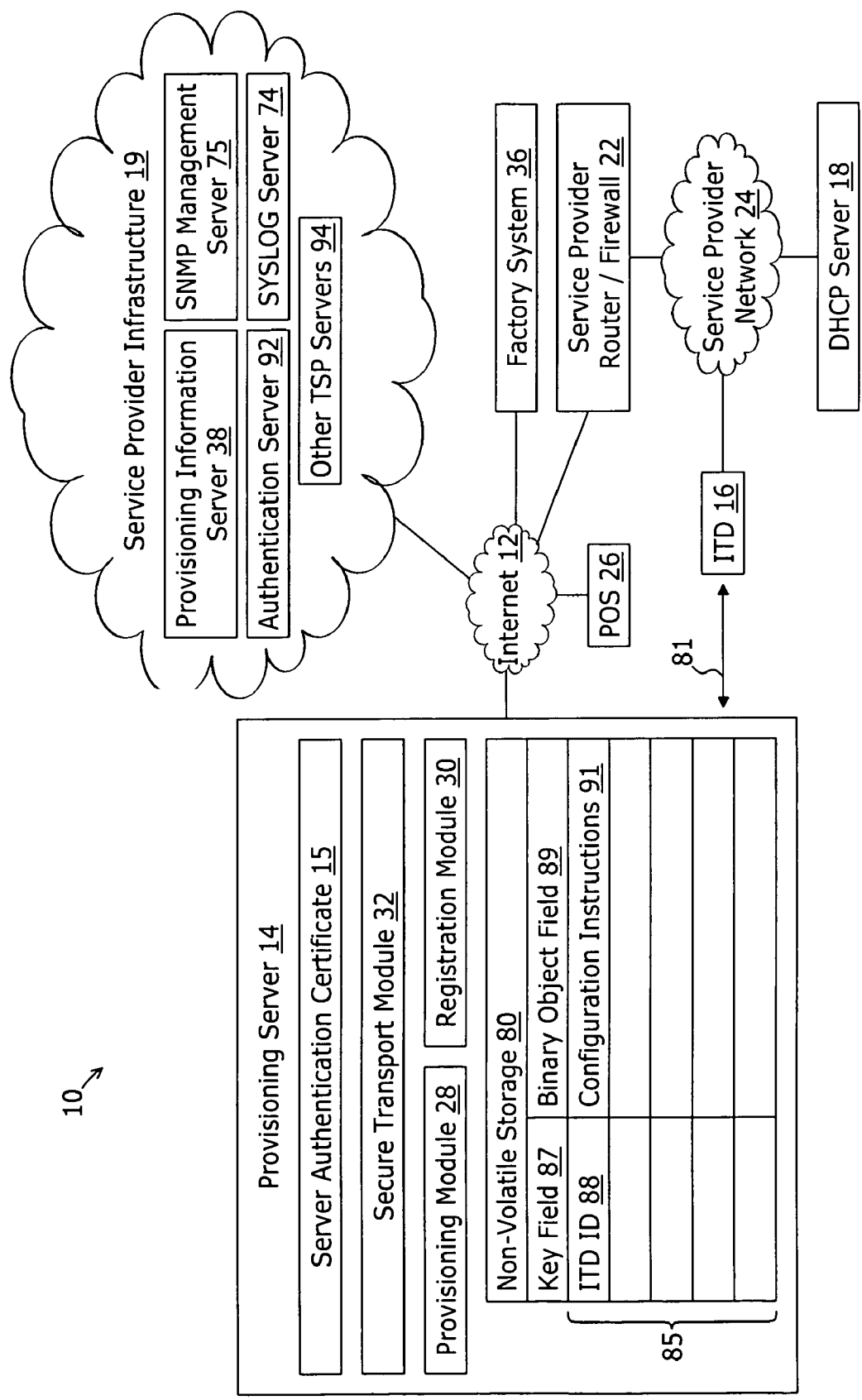
FIG. 1 is a block diagram representing a first embodiment of a provisioning system for secure provisioning.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

First Exemplary Embodiment

FIG. 1 represents a block diagram of a first embodiment of a provisioning system 10 for secure provisioning of an Internet telephony device 16. The system 10 comprises a networking protocol server (e.g. a DHCP server) 18, a factory system 36, a point of sale system 26, a provisioning server 14, and a service provider infrastructure 19. The service provider infrastructure 19 may comprise a provisioning information server 38 and other servers for managing the operation of the Internet telephony device 16—such as authentication server 92, a SNMP management server 75, a SYSLOG server 74, and other telephony service provider servers 94. All of the above described devices are interconnected by a frame switched network such as the Internet 12.

In the embodiment represented by FIG. 1, each of the Internet telephony device 16 and the DHCP server 18 are coupled to a service provider network 24 which in turn is coupled to the Internet 12 by an ISP router of firewall 22. The ISP router 22 may have Network Address Translation (NAT) capabilities and therefore the IP address assigned to Internet telephony device 16 may not be globally unique. This structure is represented in the first embodiment because such structure would be a common implementation when an Internet telephony device 16 is coupled to a home or office subnet. However, it is possible for the Internet telephony device 16 (and the DHCP server 18) to be assigned globally unique IP addresses or the service provider network 24.

The embodiment represented by FIG. 1 includes each of the provisioning server 14, the factory system 36, the POS system 26, and the service provider infrastructure 19 coupled directly to the Internet 12 (or to an ISP network that assigns each such device a globally routable IP address). This structure is represented in the first embodiment because such structure would be a common implementation, but it is possible for any of such devices to be located on subnet so long as connectivity as required for implementation of the present invention is maintained by way of firewall configuration or other means for providing network connectivity to devices located behind firewalls.

Each of the above described devices operates a suite of IP protocols that enable the device to set up TCP/IP logical connections and/or UDP/IP channels with other devices over the service provider network 24 and the Internet 12.

Figure 2:
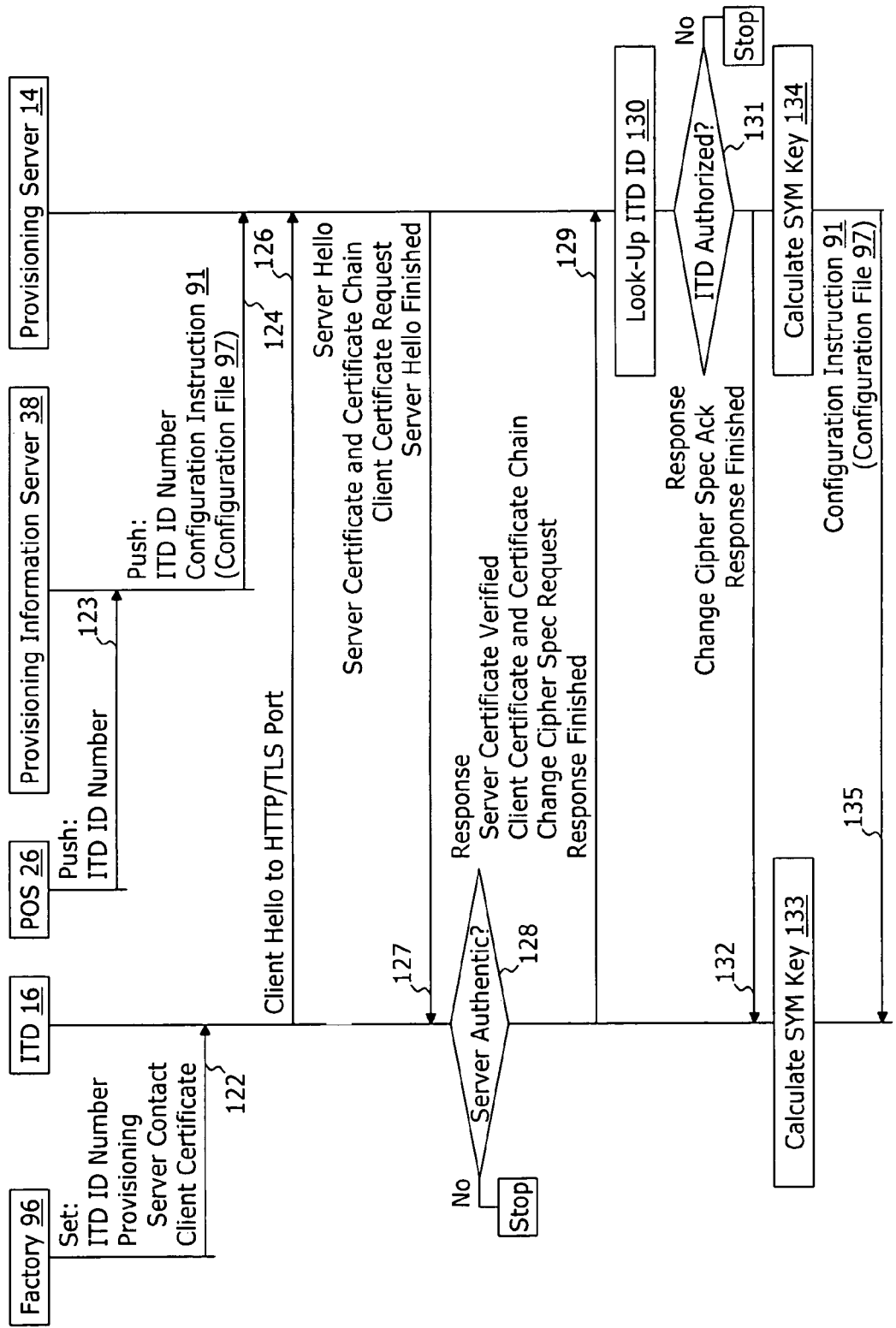
FIG. 2 is a ladder diagram representing operation of the provisioning system of FIG. 1.

The ladder diagram of FIG. 2 is useful for discussing provisioning of the Internet telephony device 16 in accordance with the first embodiment of the present invention. Referring to FIG. 2 in conjunction with FIG. 1, when an Internet telephony device 16 is manufactured, the factory system 36 assigns a unique Internet telephony device ID number 88 to the Internet telephony device 16. The unique ID number may be a variation of the globally unique MAC address of the Internet telephony device 16.

The factory system 36 stores, within non-volatile memory 52 (FIG. 7) of the Internet telephony device 16: i) the Internet telephony device ID number 88, a client authentication certificate 82 (such as an X.509 compliant certificate), and a provisioning contact 72 which may be: i) an IP address and port number on which the provisioning server 14 receives inquiries from an Internet telephony device 16; ii) a fully qualified domain name of the provisioning server 14, or iii) other information useful for contacting the provisioning server 14 over the service provider network 24 and the Internet 12. The step of storing such information in the Internet telephony device 16 is represented by step 122 of the ladder diagram of FIG. 2.

At the time an Internet telephony device 16 is purchased by a customer, the customer will also be selecting a service contract with an Internet telephony service provider—which controls the service provider infrastructure 19 (including the service provider provisioning information server 38) and possibly even the provisioning server 14. Step 123 represents the POS system 26 passing the Internet telephony device ID number 88 of the Internet telephony device 16 to the service provider provisioning information server 38.

The service provider provisioning information server 38 either: i) builds a configuration file (or image) 97 applicable to the Internet telephony device 16 or identifies an existing configuration file (or image) 97 applicable to the Internet telephony device 16 using systems that will be discussed in more detail with respect to FIG. 6. Step 124 represents the service provider provisioning information server 38 passing the Internet telephony device ID number 88 of the Internet telephony device 16 along with a configuration instruction 91 to the provisioning server 14. The configuration instruction includes the configuration file (or image) 97. In one embodiment, the Internet telephony device ID number 88 and the configuration file (or image 97) are passed in combination to the provisioning server 14 by passing the configuration file (or image) 97 with its file name including the Internet telephony device ID number 88.

At some future time, the Internet telephony device 16 will be coupled to the service provider network 24 and a network configuration module (e.g. DHCP client) 77 (FIG. 7) will obtain its IP address and networking configuration from the DHCP server 18 in a traditional manner. At this time, the Internet telephony device 16 will be able to communicate with other TCP/IP and UDP/IP compliant devices over the service provider network 24 and the Internet 12, but will not have adequate configuration information for operating as a VoIP endpoint within the service provider infrastructure 19. However, stored in its non-volatile memory 52 (FIG. 7), the Internet telephony device 88 will have its Internet telephony device ID number 88, its client authentication certificate 32, and its provisioning contact 72.

To obtain its configuration file (or image) 97, an HTTP provisioning client 73 (FIG. 7) the Internet telephony device 16 establishes a secure hyper text transport protocol link (HTTPS) 81 to the provisioning server 14 using the provisioning contact 72 by sending a ClientHello message to the applicable port (e.g. TCP/IP port 443) of the provisioning server 14 as represented by step 126.

In response, the provisioning server 14 will return a ServerHello message which includes: i) a server authentication certificate (such as an X.509 compliant certificate) 15 along with its certificate chain to a trusted certificate authority, and ii) a request for the client authentication certificate 82. Such a response is represented by step 127.

After receiving the server authentication certificate 15, the Internet telephony device 16 can authenticate the provisioning server 14 as represented by decision box 128. If the provisioning server 14 is not authenticated, operation fails.

If the provisioning server 14 is authenticated, the Internet telephony device 16 returns a response as represented by step 129. The response includes: i) an indication that the server certificate 15 authenticated; ii) the client authentication certificate 82 and certificate chain to a trusted certificate authority; iii) an indication to change the cipher specification to a symmetric algorithm; and iv) a client Diffie-Hellman parameter.

After receiving the client certificate 82, the provisioning server 14 verifies the Internet telephony device 16 at step 130 to: i) determine whether the Internet telephony device 16 is authorized; and ii) to determine a configuration file (or image) 97 to provide to the Internet telephony device 16.

If, at step 131, it is determined that the Internet telephony device 16 is authorized and a configuration file (or image) 97 corresponds to the Internet telephony device ID number 88 of the device 16, the provisioning server 14 returns, at step 132, an acknowledgment to the change cipher specification—which includes a server Diffie-Hellman parameter.

Steps 133 and 134 represent each of the Internet telephony device 16 and the provisioning server 14 calculating the symmetric key to use with the symmetric encryption algorithm using techniques such as Diffie Hellman and the parameters exchanged at steps 129 and 132.

After symmetric encryption is established, step 135 represents the provisioning server 14 providing the configuration instruction 91 (comprising the configuration file (or image) 97) to the Internet telephony device 16. Upon receipt of the configuration file (or image) 97, the Internet telephony device 16 will make the appropriate provisioning inquiries to the systems of the Internet telephony service provider's infrastructure 19 that are identified in the configuration file (or image) 97.

Provisioning Information Server

Returning to FIG. 1, the provisioning information server 38: i) builds (or looks up) the configuration file (or image) 97 that is associated with an Internet telephony device 16 (as identified to the provisioning information server 38 by the POS 26); and ii) provides such configuration file (or image) 97 to the provisioning server 14 as the configuration instructions 91 associated with the Internet telephony device ID number 88 of the device 16.

Figures 5, 6:
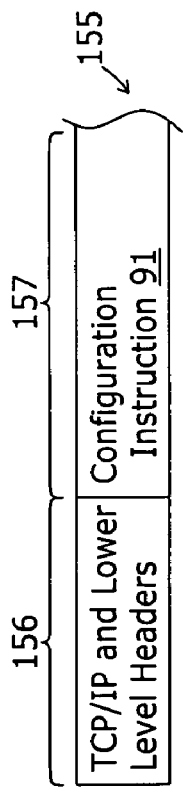
FIG. 5 is a graphic representation of each of a secure message comprising a provisioning configuration in accordance with one embodiment of the present invention.
FIG. 6 represents a exemplary embodiment of a provisioning information server in accordance with one embodiment of the present invention.

The block diagram of FIG. 6 represents an exemplary provisioning information server 38. The provisioning information server 38 comprises a provisioning database 95 and configuration instruction application 67.

The provisioning database 95 comprises a main table with a plurality of records 93, each of which includes a key information field 101 which may include the Internet telephony device ID number 88 (or a combination of identification of a manufacture, model, or other information about the Internet telephony device 16 that can be derived from its Internet telephony device ID number 88).

Associated with the key information field 101 are: i) configuration parameters 86 applicable to each Internet telephony device 16 bearing an Internet telephony device ID number 88 that is within the scope of the key information field 101; and/or ii) a configuration file (or image) 97 applicable to each Internet telephony device 16 bearing an Internet telephony device ID number 88 that is within the scope of the key information field 101.

The configuration parameters 86 may comprise both class configuration parameters 68 and device configuration parameters 66 which may be used by the configuration instruction application 67 to build a configuration file (or image) 97 for an Internet telephony device 16 bearing an Internet telephony device ID number 88 that is within the scope of the key information field 101.

When the POS system 26 (FIG. 1) sends an Internet telephony device ID number 88 to the provisioning information server 38, the configuration instruction application 67 either: i) looks up the configuration parameters 86 associated with the key field 101 that associates with the Internet telephony device ID number 88 and combines those device configuration parameters 66 and class configuration parameters 68 to build configuration file (or image) 97 there from; or ii) looks up the configuration file (or image) 97 associated with the key field 101 that associates with the Internet telephony device ID number 88.

After building (or looking up) the configuration file (or image) 97, the configuration instruction application 67 provides the configuration file (or image) 97 to the provisioning server 14 as the configuration instructions 91 discussed with respect to step 124 of the ladder diagram of FIG. 2.

Provisioning Server

Returning to FIG. 1, the provisioning server 14 comprises a provisioning server digital authentication certificate 15 (which includes a certificate chain to a trusted certificate authority), a secure transport module 32, a registration module 30, a provisioning module 28, and a non volatile storage 80.

In one embodiment, the non volatile storage 80 may be a database that includes a table with a plurality of records 85, each including a key field 87 and a binary object field 89. The key field 87 stores an Internet telephony device ID number 88. Each Internet telephony device ID value 88 stored in the database uniquely associates with an authorized Internet telephony device 16. The binary object field 89 stores the configuration file (or image) 97 associated with the Internet telephony device ID number 88.

In another embodiment (e.g an embodiment wherein the configuration instruction 91 has a file name which includes the Internet telephony device ID number 88), the non volatile storage 80 may be a directory (e.g. a location within a directory structure) which stores each configuration instruction 91 in association with its file name.

The secure transport module 32, establishes a secure communication channel with any device establishing a connection to the provisioning server 14. More specifically, the secure transport module 32 provides for exchange of authentication certificates, calculating the symmetric encryption key, and the secure transport of application level data using the symmetric encryption algorithm. In the exemplary embodiment, the secure transport module 32 may be a known HTTPS server.

The registration module 30 interfaces with the service provider provisioning information server 38 to obtain, for each authorized Internet telephony device 16, its Internet telephony device ID number 88 and its associated configuration instruction 91. The registration module 30 further writes each configuration instruction 91, in association with the device ID number 88 of the authorized device with which the configuration instruction 91 associates, to the non volatile storage 80.

In the example wherein the non volatile storage 80 is a database table, the registration module 30 builds records 85 in the database by writing each Internet telephony device ID number 88 and its associated configuration instruction 91 thereto. The Internet telephony device ID number 88 is written to a key field 87 and the configuration instruction 91 is written to a binary object filed 89.

In the example wherein the non volatile storage 80 is a directory, the registration module saves the configuration instruction 91 in the directory as a file with its file name including the Internet telephone device ID number 88

Figure 3:
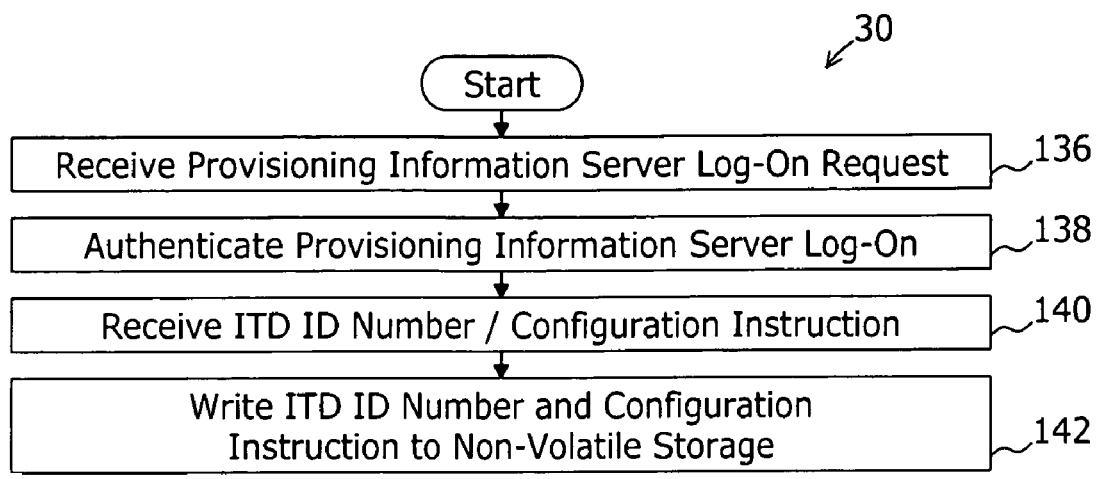
FIG. 3 is a flow chart representing exemplary operation of a registration module in accordance with one embodiment of the present invention.

Turning briefly to FIG. 3 in conjunction with FIG. 1, a flow chart representing exemplary operation of the registration module 30 and its interaction (through the secure transport module 32) with the provisioning information server 38 is shown.

Step 136 represents receiving a log-on request from the provisioning information server 38 over an HTTPS channel and step 138 represents authenticating the log on using digital certificates, user name and password, or another known authentication system.

Step 140 represent receiving an Internet telephony device ID number 88 for a newly authorized Internet telephony device 16 in combination with its configuration instruction 91.

Step 142 represents writing, to the non volatile storage 80, the configuration instruction 91 in association with the Internet telephony device ID number 88.

Figure 4:
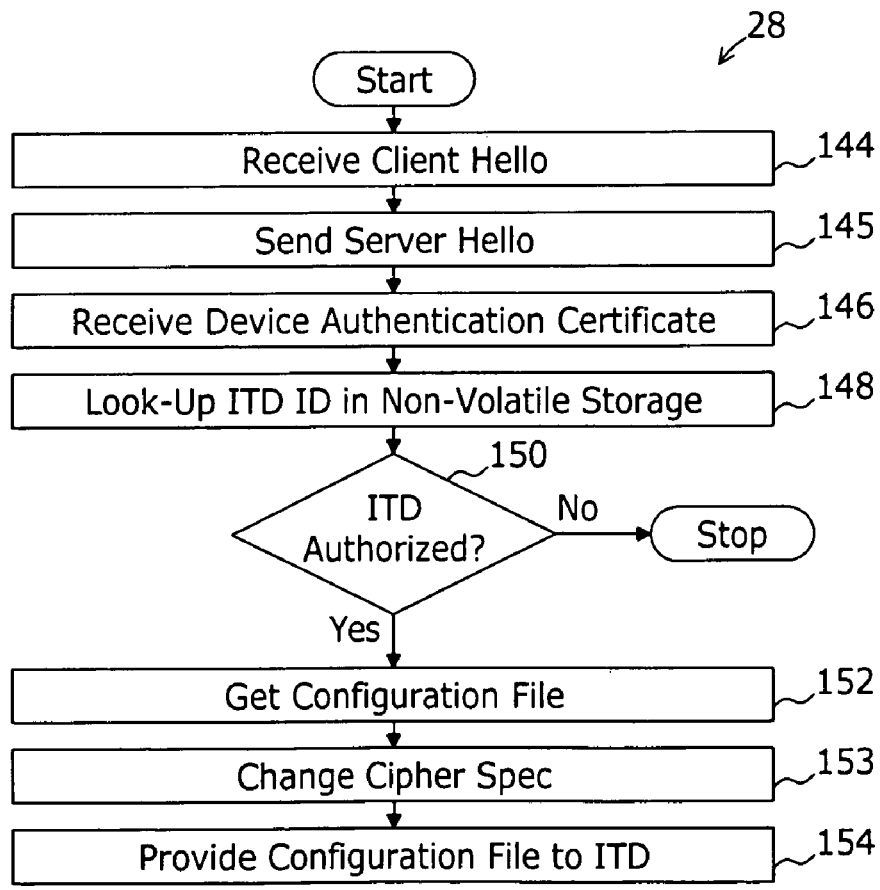
FIG. 4 is a flow chart representing exemplary operation of a provisioning module in accordance with one embodiment of the present invention.

Returning to FIG. 1, the provisioning module 28 interfaces with each authorized Internet telephony device 16 (through the secure transport module 32) to provide the Internet telephony device 16 with its configuration instruction 91. Turning briefly to FIG. 4 in conjunction with FIG. 1, a flow chart representing exemplary operation of the provisioning module 28 and its interaction with an Internet telephony device 16 is shown.

Step 144 represents receipt of a ClientHello from an Internet telephony device 16 (through the secure transport module 32) as discussed with respect to step 126 of the ladder diagram of FIG. 2 and step 145 represents returning a ServerHello as discussed with respect to step 127 of the ladder diagram of FIG. 2.

Step 146 represents receiving a device authentication certificate 82 from an Internet telephony device 16 which has established an HTTPS connection to the provisioning server 14.

Step 148 represents authenticating the Internet telephony device ID number 88 within the certificate 82 (using the certificate chain) and looking up the device ID number 88 within the non volatile storage 80 to determine whether the Internet telephony device 16 is an authorized Internet telephony device 16.

At decision step 150, the process is terminated if the Internet telephony device 16 is not authorized. Alternatively, if the Internet telephony device ID number 88 is in the non volatile storage 80 with an associated configuration instruction 91, then the Internet telephony device 16 is an authorized device and the provisioning module 28 obtains the configuration instruction 91 associated with the Internet telephony device ID number 88 at step 152.

Step 153 represents responding to the Internet telephony device 16, calculating the symmetric key, and changing the cipher specification as represented by steps 132 and 133 of the ladder diagram of FIG. 2.

Step 154 represents providing the configuration instruction 91 to the Internet telephony device 16 through the HTTPS secure channel at step 154. More specifically, step 154 may comprises the provisioning module 28 returning a message to the Internet telephony device 16 similar in structure to the message represented in the block diagram of FIG. 5. The message 155 comprises applicable TCP/IP and lower level headers 156 for transport through the HTTPS secure channel along with payload 157 that is encrypted using the symmetric key and the symmetric encryption algorithm established by the secure transport module 32 of the server 14 and the Internet telephony device 16. The encrypted payload 157 may be structured as hypertext which is a binary representation of the configuration instruction 91. Step 154 corresponds to step 135 of the ladder diagram of FIG. 2.

Internet Telephony Device

Figure 7:
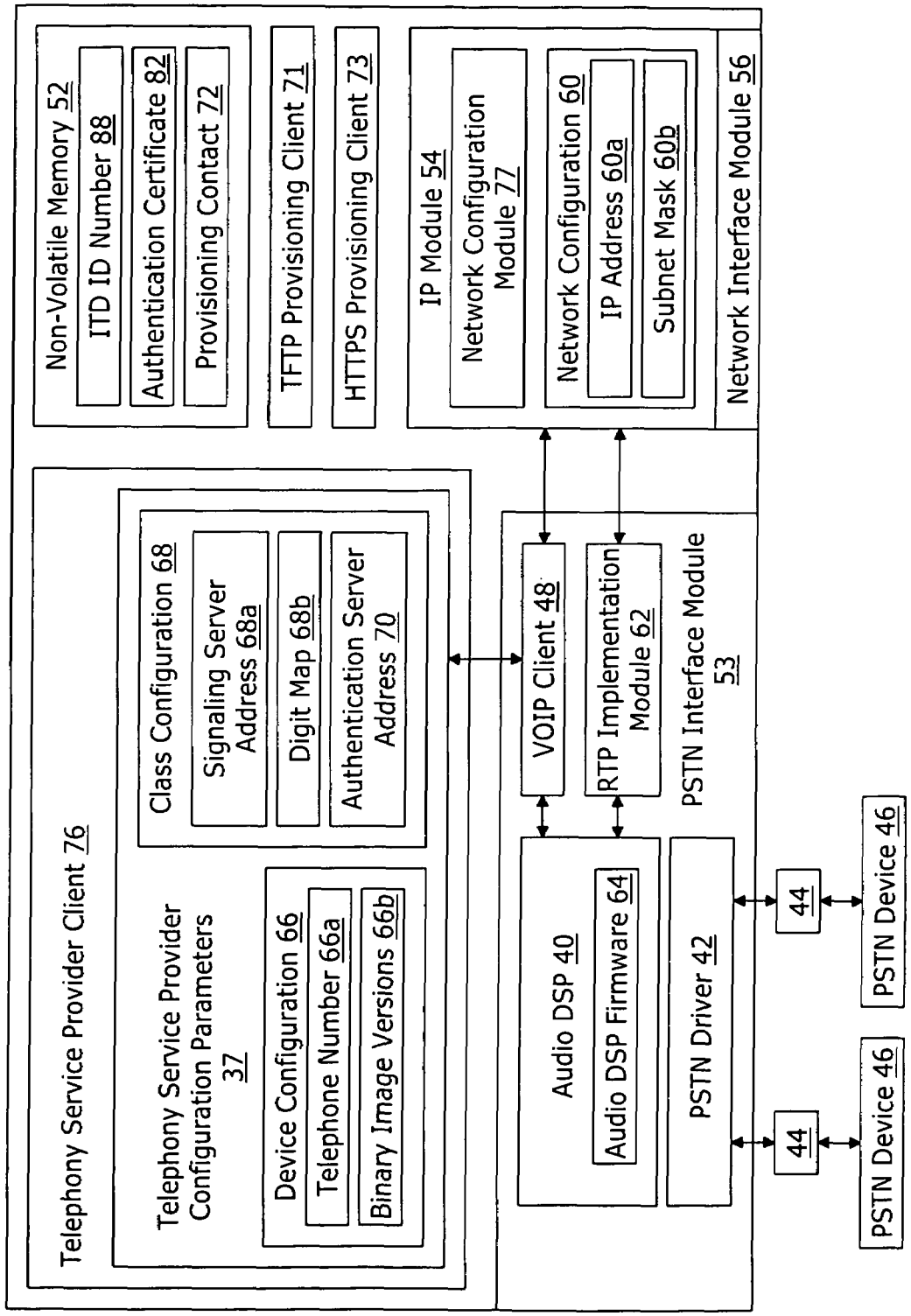
FIG. 7 is block diagram representing customer premises Internet telephony equipment in accordance with one embodiment of the present invention.

FIG. 7 is a block diagram representing an exemplary Internet telephony device 16. Referring to FIG. 7 in conjunction with FIG. 1, the Internet telephony device 16 operates as a PSTN gateway for the plurality of PSTN devices 46. More specifically, the Internet telephony device 16 includes an IP module (e.g. and IP stack and network interface circuits) 54, a first provisioning client (e.g. an HTTPS provisioning client) 73, a non-volatile memory 52, a PSTN interface module 53, and a telephony service provider client 76. Further, as will be discussed in more detail with respect to the second exemplary embodiment, the Internet telephony device may comprise a second provisioning client (e.g. a TFTP Provisioning client) 71.

The network interface module 56 utilizes known physical layer protocols which are compliant with those utilized on the service provider network 24 such that IP frames may be exchanged between the Internet telephony device 16 over the service provider network 24 and the Internet 12.

The IP module 56 formats higher level data packets into TCP/IP or UDP/IP frames for transmission to remote devices over the service provider network 24 and the Internet 12 in either secure or secure modes. To provide such formatting, the IP module 54 requires configuration parameters 60 such as an IP address 60a and a subnet mask 60b. to obtain such configuration parameters 60, the IP module may comprise a network configuration module 77 which communicates over the service provider network 24 with the DHCP server 18 to obtain the network configuration 60 necessary for operation of the IP module 54.

The HTTPS provisioning client 73: i) uses the Internet telephony device ID number 88, the authentication certificate 82, and the provisioning contact 72 stored in the non-volatile memory 52 to communicate with the provisioning server 14 (through the IP module 54) and obtain the configuration file (or image) 97 as discussed with respect to steps 126 through 135 of the ladder diagram of FIG. 2; and ii) presents such configuration file (or image) 97 to the telephony service provider client 76 such that the telephony service provider client 76 may use the configuration parameters included therein for operation as a VoIP endpoint within the service providers infrastructure 19.

The telephony service provider client 76 uses configuration parameters 37 contained in the configuration file (or image) 97 to operate as a VoIP endpoint within the Internet telephony service provider's infrastructure 19. The configuration parameters 37 comprise class configuration parameters 66 and device configuration parameters 68. Exemplary class configuration parameters 68 may comprise parameters such a signaling server addresses 68a, a digit map 68b, and other management server address 68c. Exemplary device configuration parameters 66 may comprise parameters such as the telephone number 66a assigned to the Internet telephony device 16 and binary image versions 66b (including the audio DSP firmware 64) applicable for operation of the Internet telephony device 16.

The PSTN interface module 38 emulates a PSTN subscriber loop on each of a plurality of PSTN ports 44 for interfacing with traditional PSTN devices 46 utilizing in-band analog or digital PSTN signaling. The PSTN interface module 53 includes a PSTN driver 42. The PSTN driver 42 emulates a PSTN subscriber loop on each PSTN port 44 for interfacing with a traditional PSTN device 46 utilizing in-band analog or digital PSTN signaling.

The PSTN driver 42 is coupled to an audio DSP 40 and a VoIP client 48. The VoIP client 48 interfaces with the PSTN driver 42 during call set up and exchanges VoIP call signaling with remote VoIP devices such as the soft switch or call agent, and other VoIP endpoints. More specifically, the audio DSP 40: i) detects PSTN events on each PSTN port 44 (through the PSTN driver 42) such as Off Hook, On Hook, Flash Hook, DTMF tones, Fax Tones, TTD tones and generates applicable signaling signals to the VoIP module 48; ii) generates PSTN signaling (through the PSTN driver 42) such as Ring, Dial Tone, Confirmation Tone, and in band caller ID in response to applicable signaling signals from the VoIP module 48; and iii) converts between PSTN audio media and compressed digital audio media. The audio DSP 40 also provides echo cancellation and conference mixing of digital audio signals.

The VoIP client 48 is coupled to the audio DSP 40, the telephony service provider client 76, and the IP module 54 and operates to converts between the signaling signals exchanged with the audio DSP 40 and VoIP call signaling messages (and service provider management message) exchanged with a remote VoIP endpoints and the service providers infrastructure 19.

The real time protocol implementation module 62 operated during a media session to: i) encapsulate compressed digital audio media generated by the audio DSP 40 into real time protocol frames for transmission to the remote endpoint during a media session; and ii) receives and orders real time protocol frames received from the remote endpoint and presents the compressed digital audio media encapsulated therein to the audio DSP 40.

The audio DSP 40 operates algorithms which convert between the digital audio media exchanged with the PSTN driver 42 and compressed digital audio media exchanged with the real time protocol implementation module 62 utilizing a compression algorithm stored as part of the audio DSP firmware 64. Exemplary compression algorithms utilized by audio DSP 40 include: i) algorithms that provide minimal (or no) compression (useful for fax transmission) such as algorithms commonly referred to as G.711, G.726; ii) very high compression algorithms such as algorithms commonly referred to as G.723.1 and G.729D; and iii) algorithms that provide compression and high audio quality such as algorithms commonly referred to as G.728, and G. 729E.

Figure 8:
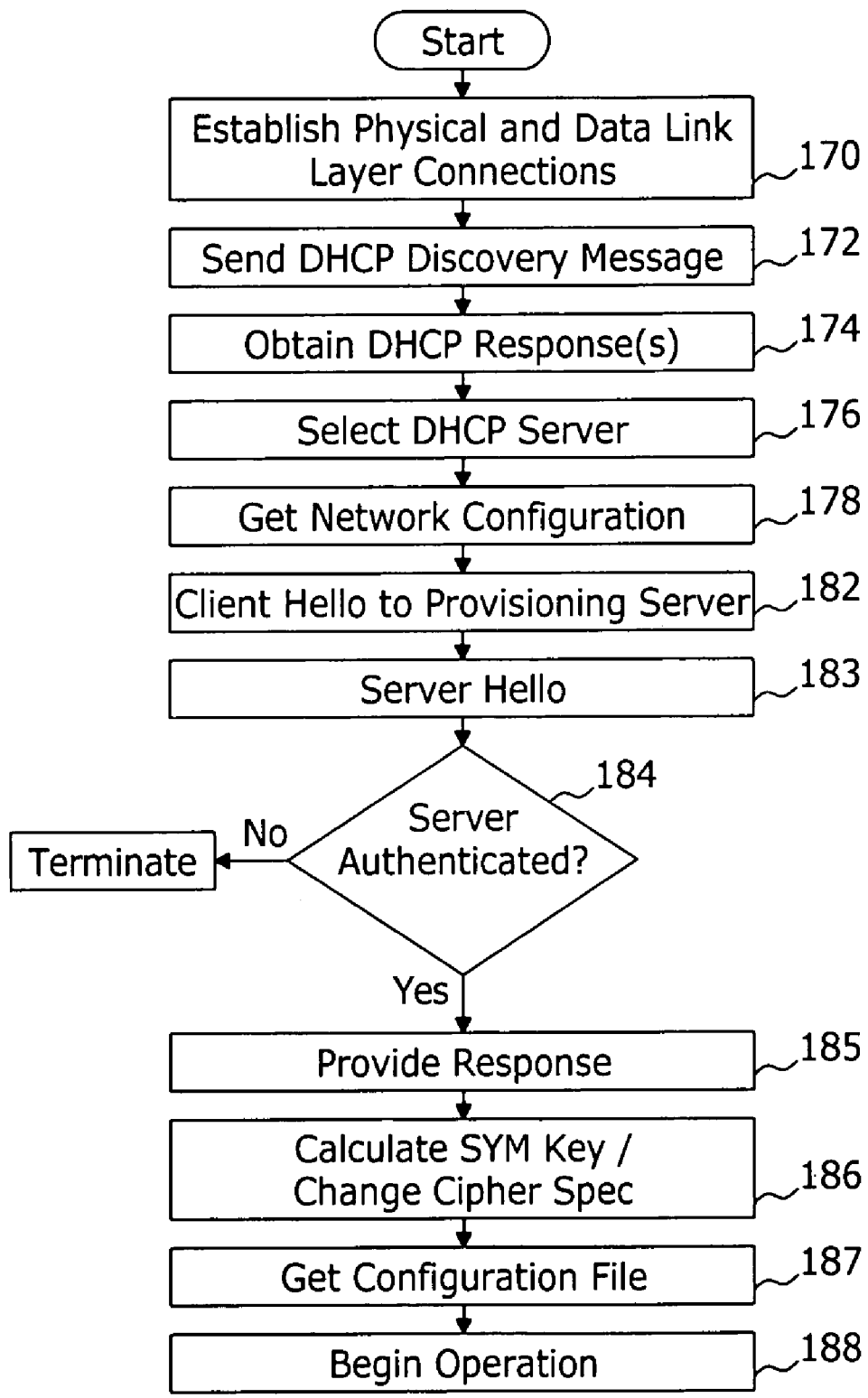
FIG. 8 is a flow chart representing exemplary operation of customer premises Internet telephony equipment in discovery of provisioning information in accordance with a first embodiment of the present invention.

The flow chart of FIG. 8 represents exemplary operation of the network interface circuit 56, the network configuration module 77 and the HTTPS provisioning client 73 to obtain the network configuration 60 and the telephony service provider configuration 37. Referring to the flow chart of FIG. 8 in conjunction with the block diagram of FIG. 1, step 170 represents the network interface module 56 establishing known physical and data link layer connections for communications over the service provider network 24 to which the Internet telephony device 16 is coupled.

Steps 172 through 178 represent the network configuration module 77 obtaining the network configuration 60 from the DHCP server 18 for operation of the Internet telephony device 16 as a network device on the service provider network 24. Steps 182-188 represent the HTTPS provisioning client 73 obtaining the Internet telephony service provider configuration parameters 37 for operation as an Internet telephony endpoint utilizing the Internet telephony service provider's infrastructure 19.

Step 172 represents the network configuration module 77 sending a known DHCP discovery message on the service provider network 24.

Step 174 represent obtaining DHCP response messages from one or more responding DHCP servers.

Step 176 represents selecting a DHCP server while silently ignoring the other responses.

Step 178 represents obtaining the network configuration 60 from the selected DCHP server. As previously discussed, the network configuration 60 may comprise an IP address 60a and a subnet mask 60b.

Step 182 represents the HTTPS client 73 providing a Client Hello message to the provisioning server 14 to establish an HTTPS session therewith. Step 182 corresponds to step 126 of the ladder diagram of FIG. 2.

Step 184 represents receiving a Server Hello message in response to the Client Hello message as discussed with respect to step 127 of the ladder diagram of FIG. 2.

Step 128 represents evaluating the server authentication certificate provided by the provisioning server 14 to determine the server's authenticity and, if the server is authenticated, a response is provided back to the server at step 185—the response includes an acknowledgement that the server certificate is verified, a client authentication certificate, and a request to change the cipher spec to a symmetric algorithm. Step 185 corresponds to step 129 of the ladder diagram of FIG. 2.

Step 186 represents calculating the symmetric key for the symmetric algorithm as discussed with respect to step 133 of the ladder diagram of FIG. 2.

Step 187 represents obtaining the configuration file (or image) 97. Step 187 corresponds to step 135 of the ladder diagram of FIG. 2.

Step 188 represents passing the configuration file 97 to the telephony service provider client 76 and beginning operation as a client to the telephony service provider infrastructure 19.

Second Exemplary Embodiment

Figure 9:
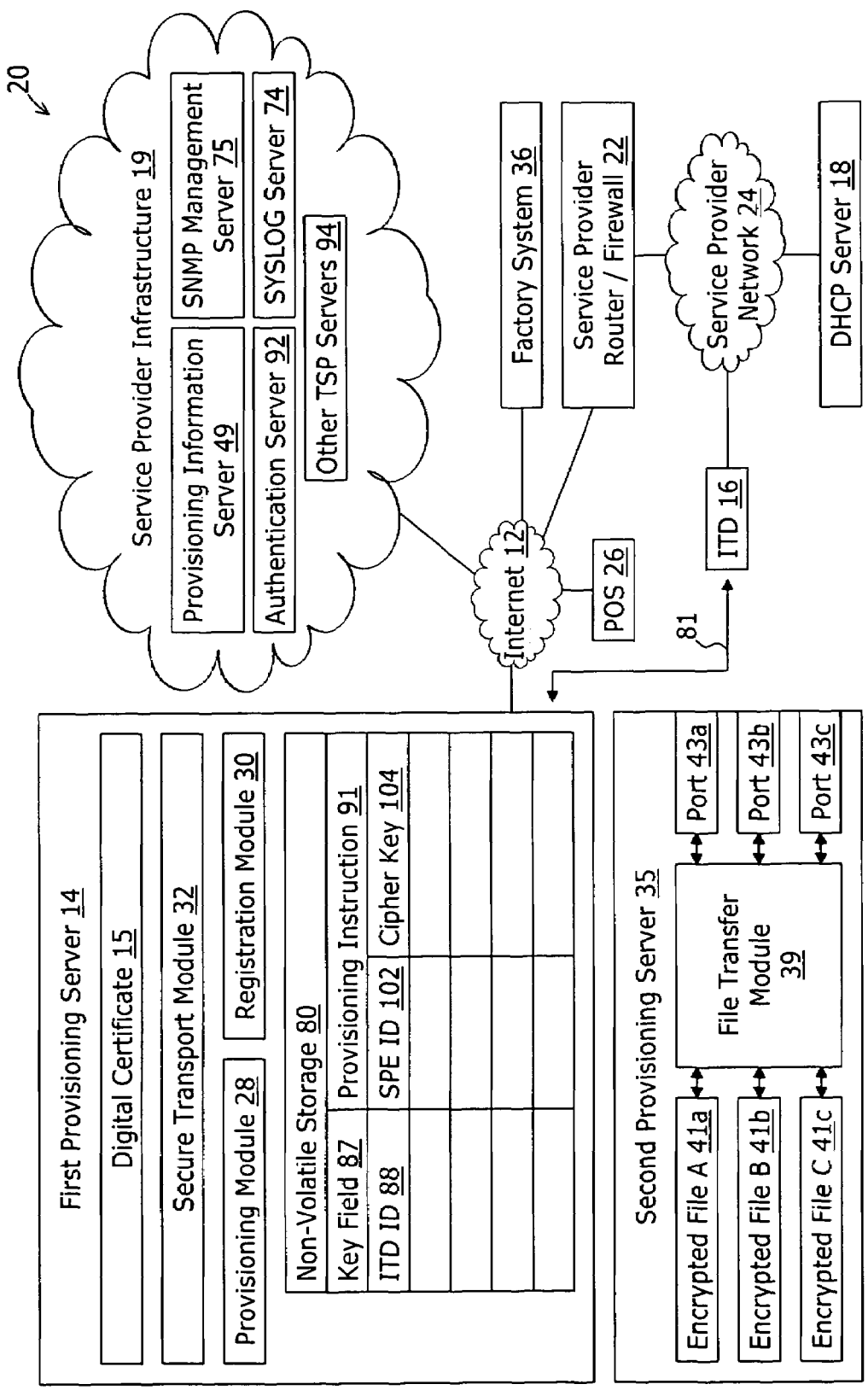
FIG. 9 is a block diagram representing a second embodiment of a provisioning system for secure provisioning.

FIG. 9 represents a block diagram of a second embodiment of a provisioning system 20 for secure provisioning of an Internet telephony device 16. Similar to the system 10 of FIG. 1, the system 20 comprises a networking protocol server (e.g. a DHCP server) 18, a factory system 36, a point of sale system 26, a provisioning server 14 (being referred to as a first provisioning server in this second embodiment), and a service provider infrastructure 19 (comprising at least a provisioning information server 49). The system 20 further comprises a second provisioning server (e.g. a trivial file transfer protocol (TFTP) server) 35—which may be part of the service provider infrastructure 19.

In this second embodiment, each of the Internet telephony device 16 and the DHCP server 18 are coupled to a service provider network 24 which in turn is coupled to the Internet 12 by an ISP router or firewall 22. The ISP router 22 may have Network Address Translation (NAT) capabilities and therefore the IP address assigned to Internet telephony device 16 may not be globally unique. Again, this structure is represented because such structure would be a common implementation when an Internet telephony device 16 is coupled to a home or office subnet, but it is possible for the Internet telephony device 16 (and the DHCP server 18) to be assigned globally unique IP addresses.

Each of the provisioning server 14, the second provisioning server 35, the factory system 36, the POS system 26, and the service provider provisioning information server 49 are coupled directly to the Internet 12 (or to an ISP network that assigns each such device a globally routable IP address). Again, this structure is represented because such structure would be a common implementation, but it is possible for any of such devices to be located on a subnet so long as connectivity as required for implementation of the present invention is maintained by way of firewall configuration or other means for providing network connectivity to devices located behind firewalls.

Figure 10A:
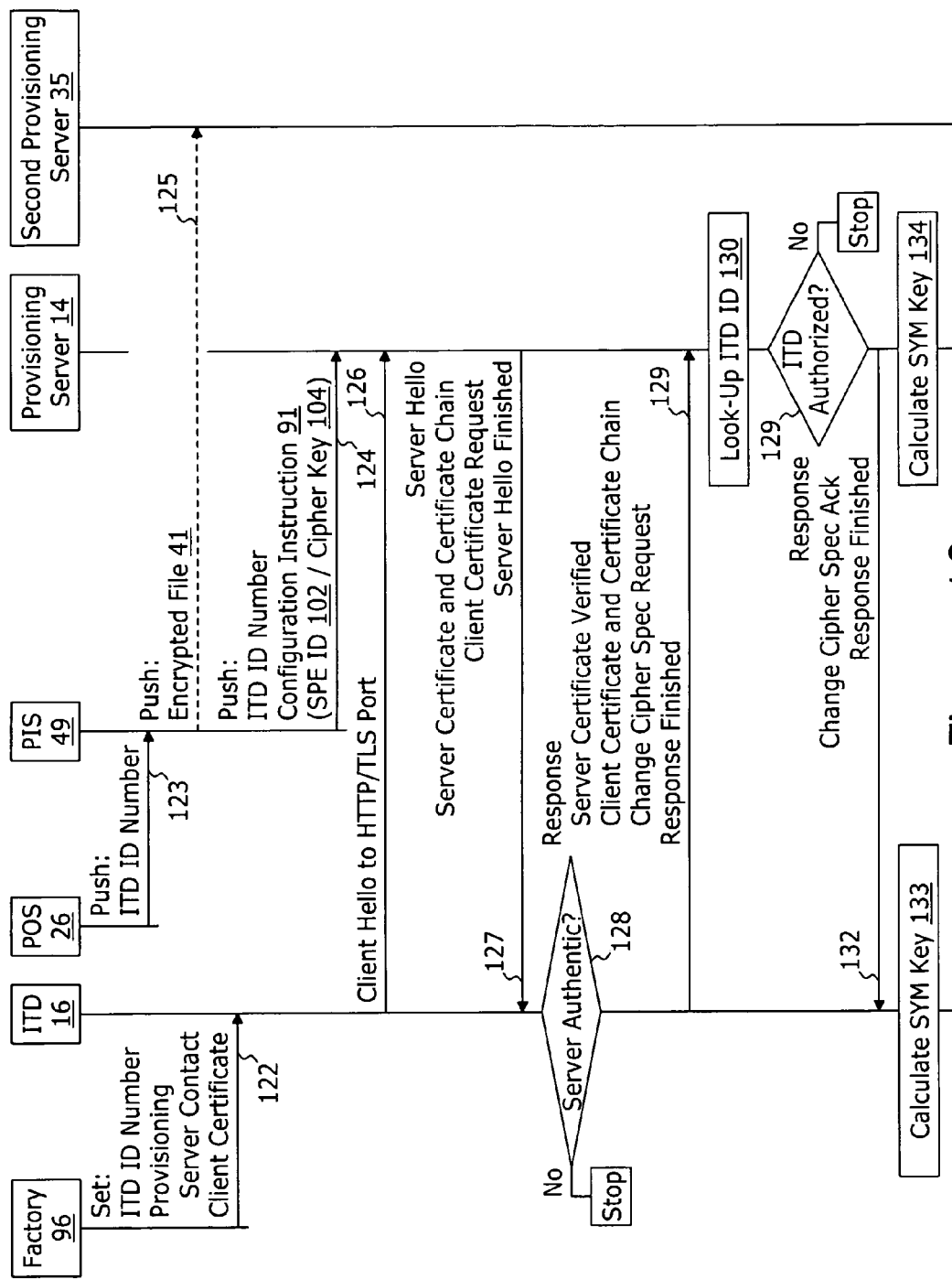
FIGS. 10a and 10b are a ladder diagram representing operation of the provisioning system of FIG. 9.
Figure 10B:
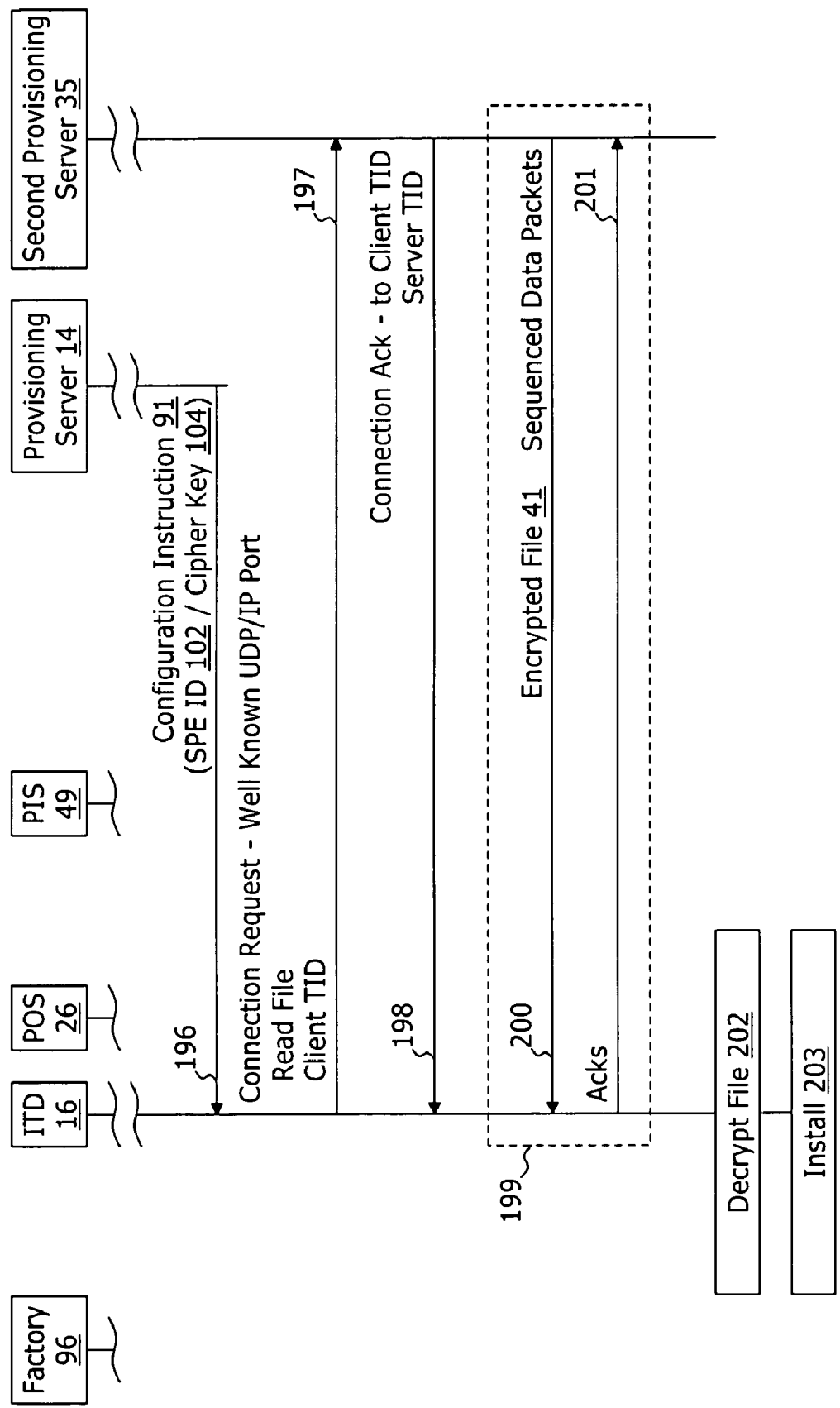

The ladder diagram of FIGS. 10*a* and 10*b* are useful for discussing provisioning of the Internet telephony device 16 in accordance with this second embodiment. With reference to FIGS. 10*a* and 10*b* in conjunction with FIG. 9, when an Internet telephony device 16 is manufactured, the factory system 36 assigns a unique Internet telephony device ID number 88 to the Internet telephony device 16 and stored, within non-volatile memory 52 (FIG. 7) of the Internet telephony device 16: i) the Internet telephony device ID number 88, a client authentication certificate 82 (such as an X.509 compliant certificate), and a provisioning contact 72 which may be: i) an IP address and port number on which the provisioning server 14 receives inquiries from an Internet telephony device 16; ii) a fully qualified domain name of the provisioning server 14, or iii) other information useful for contacting the provisioning server 14 over the service provider network 24 and the Internet 12. The step of storing such information in the Internet telephony device 16 is represented by step 122 of the ladder diagram of FIG. 10*a*.

At the time an Internet telephony device 16 is purchased by a customer, the customer will also be selecting a service contract with an Internet telephony service provider—which controls the service provider infrastructure 19 (including the service provider provisioning information server 38) and possibly even the provisioning server 14. Step 123 represents the POS system 26 passing the Internet telephony device ID number 88 of the Internet telephony device 16 to the service provider provisioning information server 49.

The service provider provisioning information server 49 builds a configuration instruction 91 applicable to the Internet telephony device 16 (or identifies an existing configuration instruction 91). In this second embodiment, the configuration instruction 91 comprises a second provisioning entity identification 102 and a cipher key 104.

Step 124 represents the service provider provisioning information server 49 passing the Internet telephony device ID number 88 of the Internet telephony device 16 along with a configuration instruction 91 to the provisioning server 14.

In an example wherein a configuration file (or image) 97 is not already stored as an encrypted file 41 (which when decrypted using the cipher key yields the configuration file (or image) 97) on the second provisioning server 35, the service provider provisioning information server 49 may also: i) build a configuration file (or image) 97 applicable to the Internet telephony device 16 (or identifies an existing configuration file (or image) 97); ii) encrypt the configuration file (or image) 97 into the encrypted file 41; and ii) provide the encrypted file 41 to the second provisioning server 35. Step 125 (optional) represents providing the encrypted file 41 to the second provisioning server 35.

At some future time, the Internet telephony device 16 will be coupled to the service provider network 24 and a network configuration module (e.g. DHCP client) 77 (FIG. 7) will obtain its IP address and networking configuration from the DHCP server 18 in a traditional manner. At this time, the Internet telephony device 16 will be able to communicate with other TCP/IP and UDP/IP compliant devices over the service provider network 24 and the Internet 12, but will not have adequate configuration information for operating as a VoIP endpoint within the service provider infrastructure 19. However, stored in its non-volatile memory 52 (FIG. 7), the Internet telephony device 88 will have its Internet telephony device ID number 88, its client authentication certificate 32, and its provisioning contact 72.

To obtain its configuration file (or image) 97, a two phase provisioning system is implement. First, the HTTPS provisioning client 73 (FIG. 7) of the Internet telephony device 16 establishes a secure HTTPS connection to the first provisioning server 14 to obtain the second provisioning entity identification 102 (e.g. an IP address and port number or a fully qualified domain name of the TFTP provisioning server) and a cipher key 104. Second, the TFTP provisioning client 71

(FIG. 7) contacts the TFTP provisioning server 35 using the second provisioning entity identification 102 to obtain an encrypted file 41. Third, the encrypted file 41 is decrypted using the cipher key 104 to yield a configuration file (or image) 97 that includes the configuration parameters 37 needed to operate as a VoIP endpoint within the service provider infrastructure 19.

At step 126, the HTTPS provisioning client 73 establishes a secure hypertext transport protocol link (HTTPS) 81 to the provisioning server 14 using the provisioning contact 72 by sending a ClientHello message to the applicable port (e.g. TCP/IP port 443) of the provisioning server 14.

In response, the provisioning server 14 will return a ServerHello message which includes: i) a server authentication certificate (such as an X.509 compliant certificate) 15 along with its certificate chain to a trusted certificate authority, and ii) a request for the client authentication certificate 82. Such a response is represented by step 127.

After receiving the server authentication certificate 15, the Internet telephony device 16 can authenticate the provisioning server 14 as represented by decision box 128. If the provisioning server 14 is not authenticated, operation fails.

If the provisioning server 14 is authenticated, the Internet telephony device 16 returns a response as represented by step 129. The response includes: i) an indication that the server certificate 15 authenticated; ii) the client authentication certificate 82 and certificate chain to a trusted certificate authority; iii) an indication to change the cipher specification to a symmetric algorithm; and a client Diffie-Hellman parameter.

After receiving the client certificate 82, the provisioning server 14 verifies the Internet telephony device 16 at step 130 to: i) determine whether the Internet telephony device 16 is authorized; and ii) to determine a configuration instruction 91 to provide to the Internet telephony device 16.

If the Internet telephony device 16 is authorized, the provisioning server 14 returns an acknowledgment to the change cipher specification—which includes a server Diffie-Hellman parameter at step 132.

Steps 133 and 134 represent each of the Internet telephony device 16 and the provisioning server 14 calculating the symmetric key to use with the symmetric encryption algorithm using techniques such as Diffie Hellman and the parameters exchanged at steps 129 and 132.

After symmetric encryption is established, step 196 represents the provisioning server 14 providing the configuration instruction 91 to the Internet telephony device 16.

After receipt of the configuration instruction 91, the second provisioning entity ID 102 included therein is passed to the TFTP provisioning client 71 and the TFTP provisioning client 71 uses such identification 102 to contact the second provisioning server 35 at step 197.

The second provisioning server 35 includes a known TFTP file transfer module 39 which uniquely associates each of a plurality of files 41a-41c with a plurality of UDP/IP ports 43a-43b. When the TFTP provisioning server 35 is contacted on a particular port, for example port 43a, the server provides the file (e.g. file 41a) associated with such port.

In this second embodiment, each file 41a-41c is an encrypted representation of a configuration file (or image) 91 that can be decrypted using a predetermined cipher key. And, the identification 102 includes the port number associated with a particular file 41a-41c and the cipher key 104 is the predetermined cipher key that can be used to decrypt such file to yield the configuration file (or image) 97.

As such, after being contacted at step 197, the second provisioning server 35 provides a known TFTP acknowledgement back to the Internet telephony device at step 198 and then each of the second provisioning server 35 and the TFTP provisioning client 71 enter a file transfer phase 199 wherein a sequence of data packets are sent to the Internet telephony device 16 (step 200) and a sequence of acknowledgements are returned to the server 35 (step 201).

Upon receipt of the complete file 41, the Internet telephony device 16 will use the cipher key 104 to decrypted the file 41 (step 202) yielding a configuration file (or image) 97 that includes the configuration parameters 37 needed for operation as a VoIP endpoint within the service provider infrastructure 19. Step 203 represents installing or otherwise providing the configuration parameters 37 to the telephony service provider client 76.

Provisioning Server

Returning to FIG. 9, the provisioning server 14 in this second embodiment, like the provisioning server 14 of the first embodiment comprises a provisioning server digital authentication certificate 15 (which includes a certificate chain to a trusted certificate authority), a secure transport module 32, a registration module 30, a provisioning module 28, and a non volatile storage 80.

However, in an embodiment wherein the non volatile storage 80 is a database, the database in this second embodiment may be different than the database in the first embodiment. While the database in the first embodiment stores a configuration instruction 91 which is a configuration file (or image) 97, the database in this second embodiment stores a configuration instruction 91 that includes the second provisioning entity ID 102 and the cipher key 104 that are associated with an Internet telephony device ID number 88. This structure enables the provisioning server 14 in this second embodiment to provide such information as discussed with respect to step 196 of FIG. 10a.

It should also be appreciated that the registration module 30 in this second embodiment operates as discussed with respect to the flow chart of FIG. 3, with the exception being that at step 142, the configuration instruction 91 would include the second provisioning entity ID 102 and the cipher key 104 rather than a configuration file (or image) 97.

Provisioning Information Server

Returning to FIG. 9, the provisioning information server 49 in this second embodiment builds the configuration instruction 91 that is to be provided to an authorized Internet telephony device 16 that contacts the provisioning server 14—to enable the Internet telephony device to obtain an encrypted file 41 from the second provisioning server 35 and decrypt such file 41 to obtain a configuration file (or image) 97. Further, the provisioning information server 49 may build the encrypted file 41 that is to be provided to the second provisioning server 35.

Figure 11:
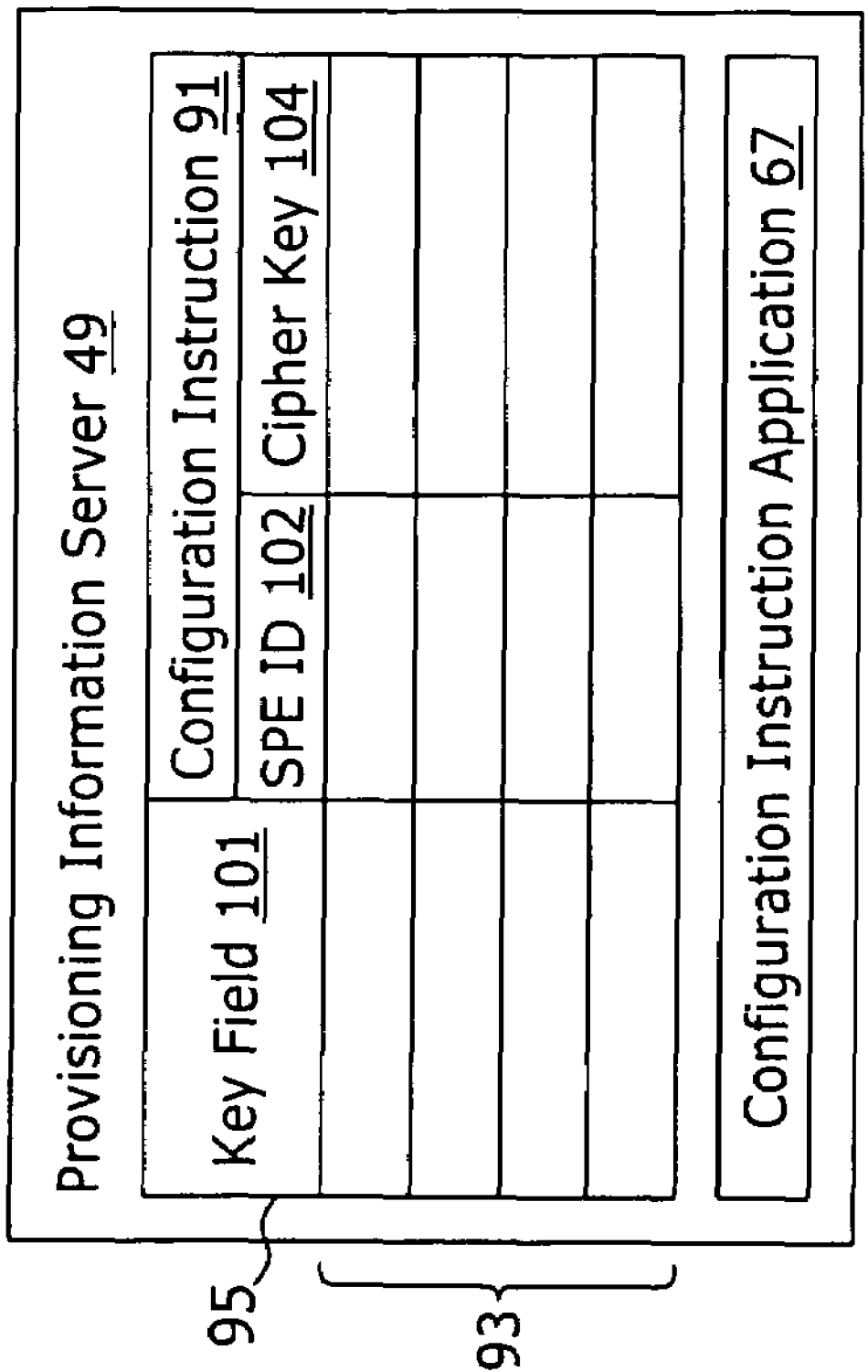
FIG. 11 represents a exemplary embodiment of a provisioning information server in accordance with the second embodiment of the present invention.

The block diagram of FIG. 11 represents an exemplary provisioning information server 49. The provisioning information server 38 of FIG. 11 comprises a provisioning database 95 and configuration file building application 67. The provisioning database 95 comprises a main table with a plurality of records 93, each of which includes a key information field 101 which may include the Internet telephony device ID number 88 (or a combination of identification of a manufacture, model, or other information about the Internet telephony device 16 that can be derived from its Internet telephony device ID number).

Associated with the key information field 101 are configuration instructions 91 (e.g. a second provisioning entity ID 102 and a cipher key 104) applicable to each Internet telephony device 16 bearing an Internet telephony device ID number 88 that is within the scope of the key information field 101. Alternatively, associated with the key information filed 101 (as discussed with respect to the first embodiment) may be configuration parameters 86 (FIG. 6) useful for building a configuration file (or image) 97.

When the POS system 26 (FIG. 9) sends an Internet telephony device ID number 88 to the provisioning information server 49, the configuration instruction application 67 looks up the configuration instructions 91 associated with the key field 101 that associates with the Internet telephony device ID number 88 and provides the configuration instruction 91 to the provisioning server 14 as discussed with respect to step 124 of the ladder diagram of FIG. 10a.

Figure 12:
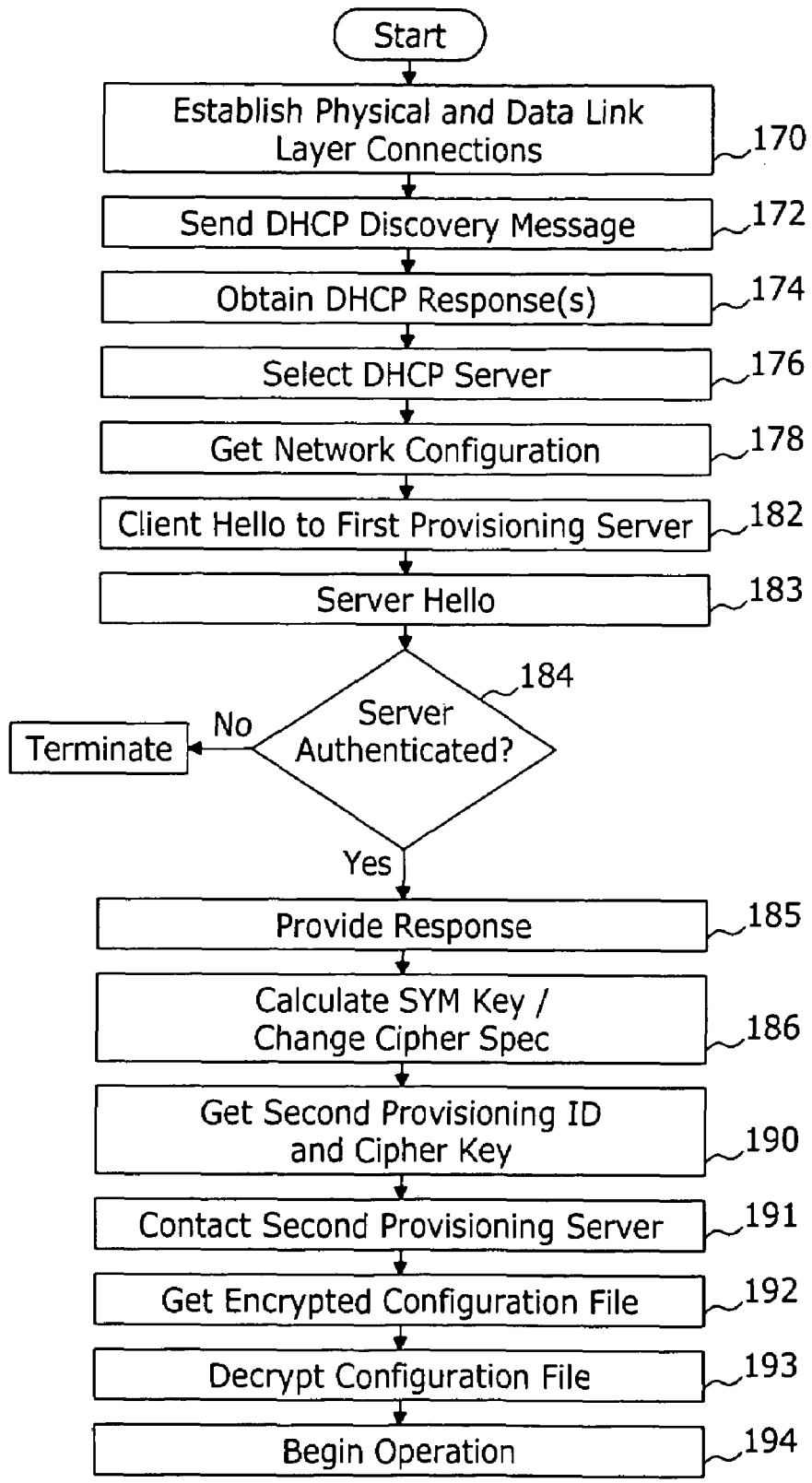
FIG. 12 is a flow chart representing exemplary operation of customer premises Internet telephony equipment in discovery of provisioning information in accordance with a second embodiment of the present invention.

In the embodiment wherein configuration parameters 86 are associated with the key information filed, the provisioning information server 49 (the configuration instruction application 67) builds the configuration file (or image) 97, creates the encrypted file 41, passes the encrypted file to the second provisioning server 35, creates the configuration instruction 91 that associated with the Internet telephony device ID number 88 and provides the configuration instruction 91 to the provisioning server 14 as discussed with respect to steps 124 and 125 of the ladder diagram of FIG. 10a Internet Telephony Device The flow chart of FIG. 12 represents exemplary operation of the network interface circuit 56, the network configuration module 77, the HTTPS provisioning client 73, and the TFTP client 71 (all of the Internet telephony device as shown in FIG. 7) to obtain the network configuration 60 and the telephony service provider configuration 37.

Referring to the flow chart of FIG. 12 in conjunction with the block diagram of FIG. 9, step 170 represents the network interface module 56 establishing known physical and data link layer connections for communications over the service provider network 24 to which the Internet telephony device 16 is coupled.

Steps 172 through 178 represent the network configuration module 77 obtaining the network configuration 60 from the DHCP server 18 for operation of the Internet telephony device 16 as a network device on the service provider network 24. Steps 182-186 represent the HTTPS provisioning client 73 obtaining the configuration instructions 91 from the first provisioning server 14. Steps 191 and 192 represent the TFTP provisioning client 71 obtaining an encrypted file from the second provisioning server 35. And, steps 194 and 194 represent recovering, from the encrypted file, Internet telephony service provider configuration parameters 37 for operation of the Internet telephony device 16 as an Internet telephony endpoint utilizing the Internet telephony service provider's infrastructure 19.

Step 172 represents the network configuration module 77 sending a known DHCP discovery message on the service provider network 24.

Step 174 represent obtaining DHCP response messages from one or more responding DHCP servers.

Step 176 represents selecting a DHCP server while silently ignoring the other responses.

Step 178 represents obtaining the network configuration 60 from the selected DCHP server. As previously discussed, the network configuration 60 may comprise an IP address 60a and a subnet mask 60b.

Step 182 represents the HTTPS client 73 providing a ClientHello message to the first provisioning server 14 to establish an HTTPS session therewith. Step 182 corresponds to step 126 of the ladder diagram of FIG. 10a.

Step 184 represents receiving a ServerHello message in response to the ClientHello message as discussed with respect to step 127 of the ladder diagram of FIG. 10.

Step 128 represents evaluating the server authentication certificate provided by the provisioning server 14 to determine the server's authenticity and, if the server is authenticated, a response is provided back to the server at step 185—the response includes an acknowledgement that the server certificate is verified, a client authentication certificate, and a request to change the cipher spec to a symmetric algorithm. Step 185 corresponds to step 129 of the ladder diagram of FIG. 10a.

Step 186 represents calculating the symmetric key for the symmetric algorithm as discussed with respect to step 133 of the ladder diagram of FIG. 10a.

Step 190 represents obtaining the configuration instruction 91 (e.g. the second provisioning entity ID 102 and the cipher key 104) from the first provisioning server 14. Step 190 corresponds to step 196 of the ladder diagram of FIG. 10a.

Step 191 represents using the configuration instruction 91 (more specifically, using the second provisioning entity ID 102) to contact the second provisioning server 35 and step 192 represent obtaining the encrypted file 41 which corresponds to the port number 43a-43c on which the second provision server 35 was contacted (based on the second provisioning entity ID 102).

Step 193 represents passing the encrypted file 41 to the telephony service provider client 76 along with the cipher key 104 such that it may be decrypted to recover the configuration file 97. Step 194 represents the telephony service provider client beginning operation as a client to the telephony service provider infrastructure 19.

With reference to FIG. 1 and FIG. 9, it should be appreciated that the key distinction between the first embodiment and the second embodiment is that in the first embodiment, the configuration file 97 itself is securely provided to the Internet telephony device 16 over an HTTPS connection between the provisioning server 14 and the Internet telephony device 16. In the second embodiment, the provisioning server provides, over the HTTPS secure connection, the contact information to a TFTP provisioning server and a key for deciphering a file that will be provided by the TFTP server. The TFTP server in turn provided an encrypted file, that when decrypted using the cipher key, yields the configuration file 97. The enables a traditional TFTP server to be used for providing a configuration file, but adds security that would not otherwise be present in a TFTP file transfer.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A provisioning system for authenticating an authorized device and providing a configuration instruction to the authorized device over an open network, the provisioning system comprising:

non-volatile storage for storing, for each a plurality of authorized devices, a configuration instruction in association with an identification of the authorized device;

a secure transport module for receiving a secure hyper text transport protocol connection request from the device and, in response thereto, establishing a secure hyper text transport protocol communication channel with the device using a symmetric encryption algorithm and a mutually calculated shared secret key;

a sever authentication certificate including identification of the provisioning system;

a provisioning module for providing, through the secure communication channel, the configuration instruction and the server authentication certificate to the device only if an identification of the device included in a device authentication certificate matches the identification of an authorized device with which a configuration instruction is associated; and the configuration instruction being one of: i) a configuration file and ii) a configuration image; and the configuration instruction including at least one of: i) configuration parameters for the authorized device; and ii) identification of a second provisioning server and identification and a cipher key; and the provisioning system further comprising a registration module:

for authenticating a provisioning information server;

receiving from the provisioning information server, for each authorized device, the configuration instruction associated with the authorized device; and writing the configuration instruction, in association with the device ID of the authorized device with which the configuration instruction associates, to the non volatile storage.

2. The provisioning system of claim 1, wherein the configuration instruction includes configuration parameters for the authorized device and the system further comprises the provisioning information server, the provisioning information server comprising:

a database storing configuration parameters to be provided to an authorized device;

a configuration instruction application for:

looking up configuration parameters associated with an authorized device and generating the configuration instruction; and providing the configuration instruction in association with identification of an authorized device with which the configuration instruction associates to the registration module.

3. The provisioning system of claim 1, wherein the configuration instruction includes the identification of a second provisioning server and a cipher key and the system further comprises the provisioning information server, the provisioning information server comprising:

a database storing configuration parameters to be provided to an authorized device;

a configuration instruction application for:

looking up configuration parameters associated with an authorized device and generating the cipher key and an encrypted configuration file, the encrypted configuration file being a file which, when decrypted using the cipher key, yields one of a configuration file and a configuration image containing configuration parameters;

providing the encrypted configuration file to the second provisioning server;

encapsulating the identification of the second provisioning server and the cipher key into a configuration instruction; and providing the configuration instruction in association with identification of an authorized device with which the configuration instruction associates to the registration module.

4. A provisioning system for providing configuration parameters, as one of a configuration file and a configuration image, to an authorized device over an open network, the provisioning system comprising:

a first provisioning server comprising:

non-volatile storaae for storing, for each of a plurality of authorized devices, the configuration instruction that associates with the authorized device, the configuration instruction including identification of a second provisioning server and a cipher key;

a secure transport module for receiving a secure connection request from the device and, in response thereto, establishing a secure communication channel with the device using a symmetric encryption algorithm and a mutually calculated shared secret key; and a provisioning module for providing, through the symmetrically encrypted communication channel, the configuration instruction to the device only if the identification of the device included in a device authentication certificate matches the identification of an authorized device with which a configuration instruction is associated;

the second provisioning server comprising:

an encrypted file configured for yielding one of a configuration file and a configuration image when decrypted using the cipher key; and a file transfer module for providing the encrypted configuration file upon request from the authorized device; and wherein the first provisioning server further comprises a registration module for:

authenticating a provisioning information server;

receiving from the provisioning information server, for each authorized device, the configuration instruction associated with the authorized device; and writing the configuration instruction, in association with the device ID of the authorized device with which the configuration instruction associates, to the non volatile storage.

5. The provisioning system of claim 4, further comprising the provisioning information server, the provisioning information server comprising:

a database storing configuration parameters to be provided to an authorized device;

a configuration instruction application for:

looking up configuration parameters associated with an authorized device and generating the cipher key and the encrypted configuration file;

providing the encrypted configuration file to the second provisioning server;

encapsulating the identification of the second provisioning server and the cipher key into the configuration instruction; and providing the configuration instruction in association with identification of an authorized device with which the configuration instruction associates to the first provisioning server.

6. A provisioning system for providing configuration parameters, as one of a configuration file and a configuration image, to an authorized device over an open network, the provisioning system comprising:

a first provisioning server comprising:

non-volatile storage for storing, for each of a plurality of authorized devices, the configuration instruction that associates with the authorized device, the configuration instruction including identification of a second provisioning server and a cipher key;

a secure transport module for receiving a secure connection request from the device and, in response thereto, establishing a secure communication channel with the device using a symmetric encryption algorithm and a mutually calculated shared secret key; and a provisioning module for providing, through the symmetrically encrypted communication channel, the configuration instruction to the device only if the identification of the device included in a device authentication certificate matches the identification of an authorized device with which a configuration instruction is associated;

the second provisioning server comprising:

an encrypted file configured for yielding one of a configuration file and a configuration image when decrypted using the cipher key; and a file transfer module for providing the encrypted configuration file upon request from the authorized device; and wherein the file transfer module of the second provisioning server:

receives requests for files on a plurality of port numbers, each of the plurality of port numbers being uniquely associated with an encrypted configuration file; and the file transfer module provides to the device the encrypted configuration file that uniquely associates with the port on which the device made its request to the second provisioning server.

7. The provisioning system of claim 6, wherein the first provisioning server further comprises a registration module for:

authenticating a provisioning information server;

receiving from the provisioning information server, for each authorized device, the configuration instruction associated with the authorized device; and writing the configuration instruction, in association with the device ID of the authorized device with which the configuration instruction associate, to the non volatile storage.

8. The provisioning system of claim 7, further comprising the provisioning information server, the provisioning information server:

a database storing configuration parameters to be provided to an authorized device;

a configuration instruction application for:

looking up configuration parameters associated with an authorized device and generating the cipher key and the encrypted configuration file;

providing the encrypted configuration file to the second provisioning server;

encapsulating the identification of the second provisioning server and the cipher key into the configuration instruction; and providing the configuration instruction in association with identification of an authorized device with which the configuration instruction associates to the first provisioning server.

9. A method for securely providing a configuration instruction to a network device, the method comprising:

storing, in a non-volatile storage, for each of a plurality of authorized devices, a configuration instruction in association with an identification of the authorized device;

receiving a secure hyper text transport protocol connection request from a device and, in response thereto, establishing a secure hyper text transport protocol communication channel with the device using a symmetric encryption algorithm and a mutually calculated shared secret key;

providing, through the symmetrically encrypted hypertext transport control communication channel, the configuration instruction to the device only if the identification of the device included in a device authentication certificate matches the identification of an authorized device with which a configuration instruction is associated; and the configuration instruction being one of: i) a configuration file and ii) a configuration image: and the configuration instruction including at least one of: i) configuration Parameters for the authorized device: and ii) identification of a second provisioning server identification and a cipher key, and the method further comprising:

establishing a secure communication channel with a provisioning information server;

authenticating the provisioning information server;

receiving from the provisioning information server, for each authorized device, the configuration instruction associated with the authorized device; and writing the configuration instruction, in association with the device ID of the authorized device with which it associates, to a non volatile storage for subsequent provisioning to the authorized device.

10. The method of claim 9, wherein the configuration instruction includes configuration parameters for the authorized device and the method further comprises the following steps performed by the provisioning information server:

obtaining identification of an authorized device;

looking up configuration parameters associated with the authorized device and generating the configuration instruction; and providing the configuration instruction in association with identification of an authorized device with which the configuration instruction associates to a first provisioning server which subsequently provides the configuration instruction to the device.

11. The system of claim 9, wherein the configuration instruction includes the identification of a second provisioning server and a cipher key and the method further comprises the following steps performed by the provisioning information server:

obtaining identification of an authorized device;

looking up configuration parameters associated with the authorized device and generating the cipher key and the encrypted configuration file;

providing the encrypted configuration file to the second provisioning server;

encapsulating the identification of the second provisioning server and the cipher key into the configuration instruction; and providing the configuration instruction in association with identification of an authorized device with which the configuration instruction associates to a first provisioning server which subsequently provides the configuration instruction to the device.

* * * * *